Sept. 16, 1958

J. E. NAUTA 2,852,162

DEVICE FOR PRODUCING A VIBRATING MOVEMENT TO
CONTROL THE RATE OF MATERIAL DELIVERY

Filed Dec. 4, 1953

INVENTOR
JOHANNES EWARDUS NAUTA

ATTORNEY

Sept. 16, 1958　　　　　J. E. NAUTA　　　　　2,852,162
DEVICE FOR PRODUCING A VIBRATING MOVEMENT TO
CONTROL THE RATE OF MATERIAL DELIVERY
Filed Dec. 4, 1953　　　　　　　　　　　　　4 Sheets-Sheet 2
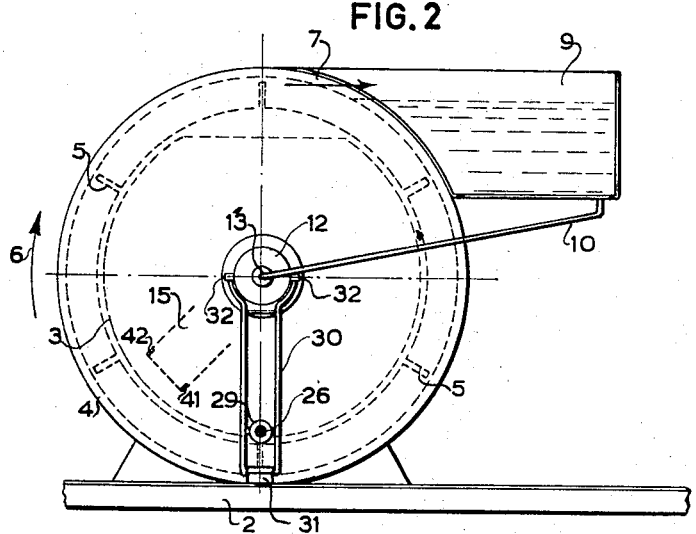
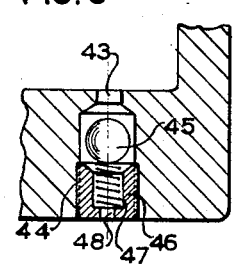
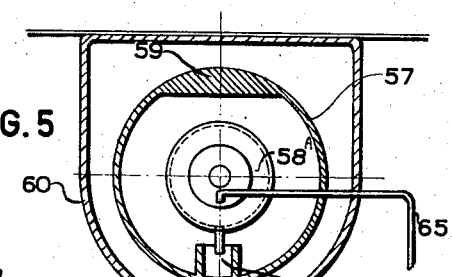
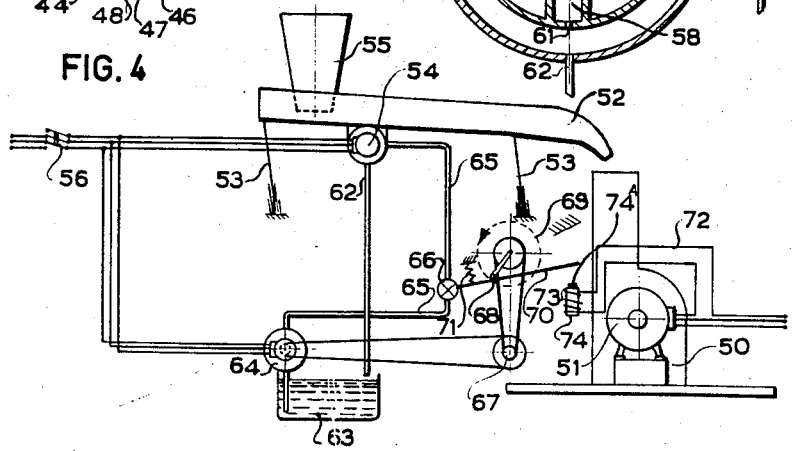
INVENTOR
JOHANNES EWARDUS NAUTA
BY
ATTORNEY Sept. 16, 1958   J. E. NAUTA   2,852,162
DEVICE FOR PRODUCING A VIBRATING MOVEMENT TO
CONTROL THE RATE OF MATERIAL DELIVERY
Filed Dec. 4, 1953   4 Sheets-Sheet 3

INVENTOR
JOHANNES EWARDUS NAUTA
ATTORNEY

Sept. 16, 1958 J. E. NAUTA 2,852,162
DEVICE FOR PRODUCING A VIBRATING MOVEMENT TO
CONTROL THE RATE OF MATERIAL DELIVERY
Filed Dec. 4, 1953 4 Sheets-Sheet 4

INVENTOR
JOHANNES EWARDUS NAUTA
ATTORNEY

United States Patent Office 2,852,162
Patented Sept. 16, 1958

2,852,162

DEVICE FOR PRODUCING A VIBRATING MOVEMENT TO CONTROL THE RATE OF MATERIAL DELIVERY

Johannes Ewardus Nauta, Overveen, Netherlands

Application December 4, 1953, Serial No. 396,301

Claims priority, application Netherlands December 10, 1952

10 Claims. (Cl. 222—57)

This invention relates to a device for producing a vibrating movement by means of a rotating system having its centre of gravity at a location spaced radially from its axis of rotation.

In known vibrating or oscillatory devices of this kind the amplitude of the vibrating movement is generally adjusted by varying the distance of a weight belonging to the rotating system from the axis of rotation.

The present invention has for its object to effect the adjustment of the amplitude in a different and very advantageous manner. According to the invention this is attained by the fact that the rotating system comprises a liquid chamber located substantially on one side of the axis of rotation, said liquid chamber being provided with an outlet opening through which liquid in said chamber can be swung to the outside, means being provided to conduct the liquid emerging from the chamber back towards said chamber and to maintain the liquid in said chamber at a level which is variable during rotation of the system. Due to this arrangement various advantages associated with a servo-system, such as e. g. the possibility of limiting the velocity with which the variation takes place, may be obtained in a very simple manner.

With the above mentioned objects and other objects, features and details in view, the invention will be hereinafter more fully described with reference to the accompanying drawings in which some preferred embodiments of the device according to the invention have been illustrated by way of example and in which:

Fig. 2 is a front elevation of the device shown in Fig. 1;

Fig. 3 shows a detail of the same device on a larger scale;

Fig. 4 is a diagrammatic view of another embodiment of the device according to the invention;

Fig. 5 is a cross sectional view of the rotating system in said device;

Figure 7:
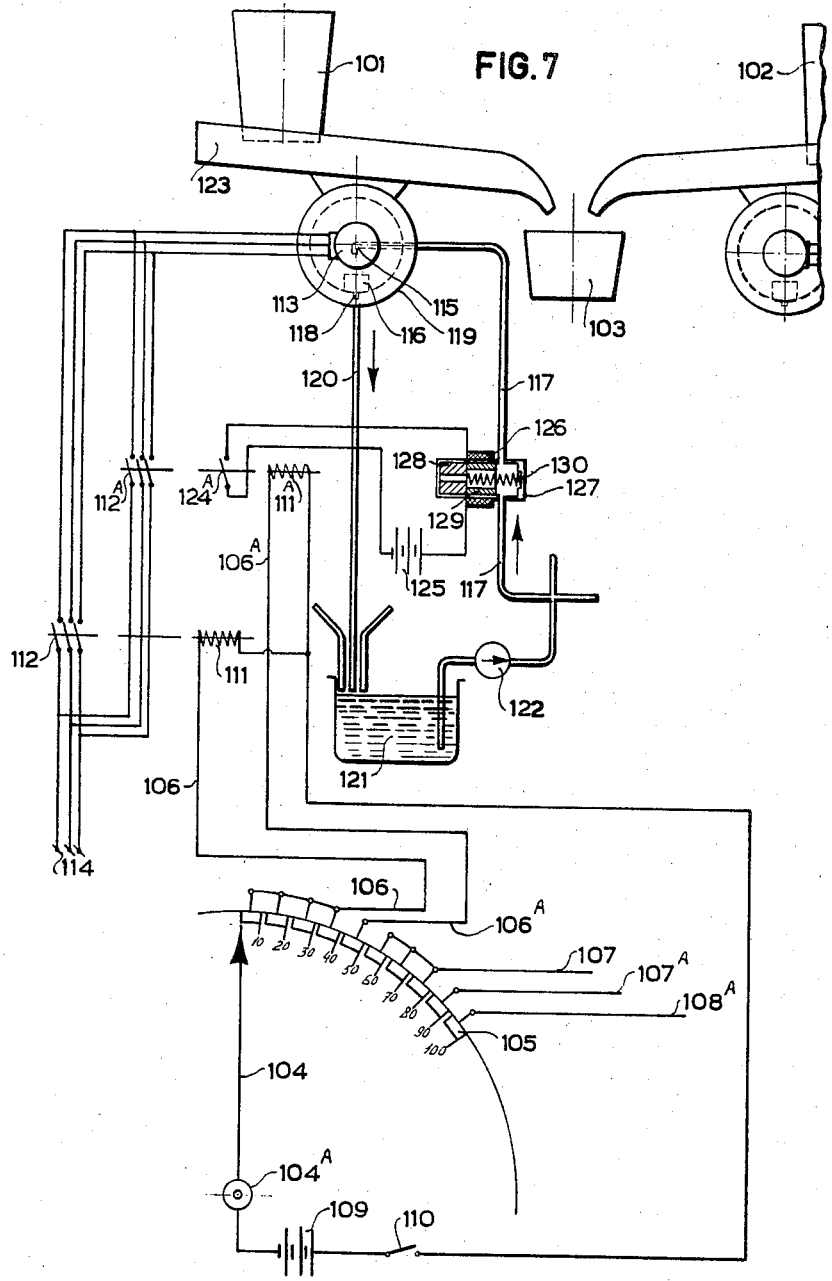

Fig. 7 diagrammatically shows a fourth embodiment of the device according to the invention.

Figure 1:
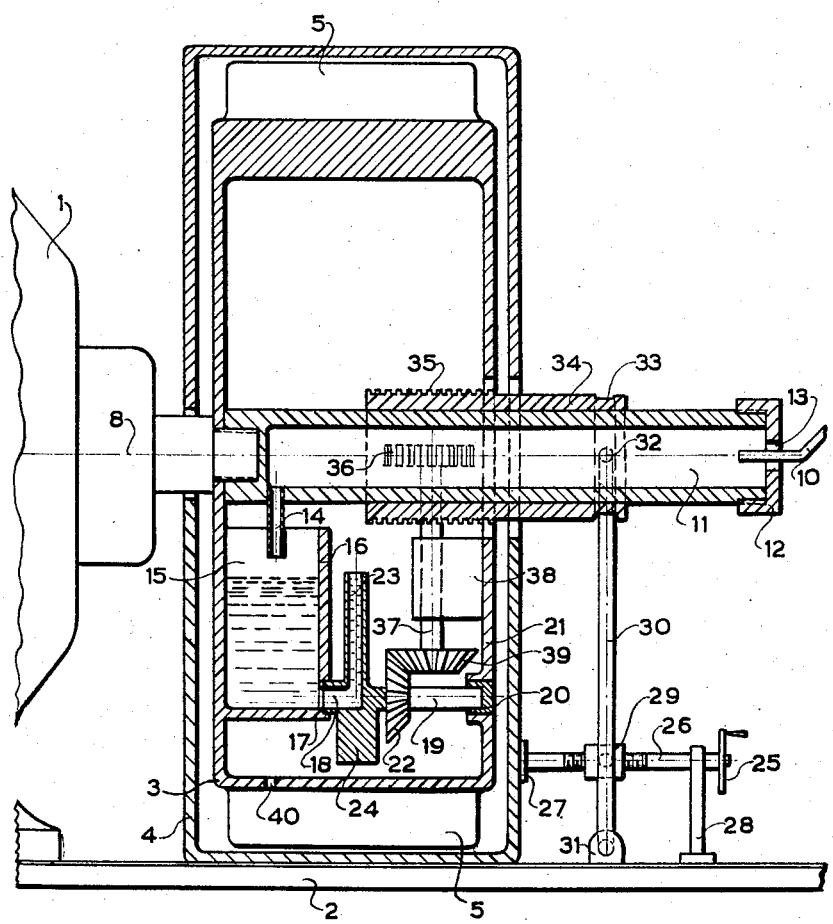
Fig. 1 shows a side elevation, partly in section, of a first embodiment of the vibrating or oscillatory device.

Referring to Fig. 1 of the drawings, an electric motor 1 is mounted on a plate 2 which has to be vibrated. Said motor 1 carries a rotatory drum 3 upon an extending shaft, said drum 3 being located within a stationary housing 4. The outer circumference of the drum 3 is provided with agitating blades 5 causing a liquid, e. g. oil, with which the housing 4 is filled, to rotate in the direction of the arrow 6 (see Fig. 2). Said liquid is thrown through an aperture 7 in the upper part of the housing and accumulated in a container 9 provided above the axis of rotation 8 of the electric motor 1. From the bottom of said container 9 the liquid flows through a tube 10 into a hollow cylindrical body 11 which is in alignment with the axis 8. The outer end of said body 11 is closed by a cap 12 which is provided with a central opening 13 having a smaller diameter than the cylindrical body 11. The tube 10 extends at its extremity through the opening 13 without coming into touch with the rotating parts of the system. The liquid is allowed to leave the hollow body 11 through a radial tube 14 which extends into a liquid chamber 15 rotating together with the drum 3. The contents of the container 9 are greater than those of the liquid chamber 15, the whole system containing no more liquid than said container 9 is able to contain.

A lateral wall 16 of the chamber 15 located within the rotatory drum 3 is provided at its radially outer portion with an aperture 17 constituting a bearing for the hollow end 18 of an axle 19. The other end of said axle 19 is mounted in a bearing 20 fixed in the radial wall 21 of the drum 3 which is remote from the motor 1. The axle 19 carries a bevelled gear wheel 22, a tube 23 at right angles to said axle and a counter weight 24 which substantially counterbalances the weight of tube 23 with liquid in the latter, whereby the centre of gravity of the parts 19, 22 and 23 is located substantially in the axis of rotation of the axle 19. The tube 23 communicates with the hollow end 18 of the axle 19, so that the tube 23 and the liquid chamber 15 may be considered as communicating vessels. By the supply of oil through the tube 14 the level in the liquid chamber 15 can never rise appreciably above the height of the free extremity of the tube 23. The distance between said extremity and the axis 8 depends on the position of the axle 19. This position is adjustable during rotation of the system by means of a handwheel 25 which is adapted to rotate a spindle 26 mounted in bearings 27 and 28 so as to be rotatable but immovable in longitudinal direction. During this rotation a threaded block 29 is displaced along the threaded middle part of the spindle 26, in consequence of which a lever 30 having bearings for pins connected to the block 29 will be operated. The lower end of the lever 30 extends into a slitted body 31 mounted upon the plate 2. The upper end of the lever 30 carries two pins 32 engaging a ring shaped slit 33 at one extremity of a bush 34. The other extremity of said bush 34 is provided with a set of circumferential grooves 35 having in cross section the shape of a gear rack. Said grooves 35 are engaged by the teeth of a gear wheel 36 secured to one end of an axle 37. Said axle 37 is rotatably mounted in a bearing 38 fixed to the wall 21 and carries at its other end a bevelled gear wheel 39 cooperating with the gear wheel 22. Consequently, if the handwheel 25 is turned, the bush 34 will be shifted by the pins 32 and will cause rotation of the axle 37 and the axle 19 by predetermined angles. The distance between the free extremity of the tube 23 and the axis 8 determines the level in the liquid chamber 15, so that said level may be adjusted by means of the handwheel 25. It should be observed that any liquid leaving the tube 23 will be immediately discharged from the drum 3 through apertures 40.

A sudden change in the position of the handwheel 25 will only cause a retarded and gradual variation of the liquid level and, therefore, of the amplitude of the vibration. The speed of the variations is substantially determined by the hydrodynamic resistances in the tubes 10 and 23 and may be chosen, therefore, at will by suitably dimensioning said tubes or by purposely providing contractions therein. Gradual variation of the amplitude is an important advantage in many cases. In the described device the handwheel 25 itself takes part in the vibrations; of course this may be avoided by mounting the handwheel on a non-vibrating part of the structure and connecting it to the spindle 26 e. g. through a flexible shaft.

It will be understood that the axle 19 need not be parallel to the axis 8, but may be arranged at right angles to the latter. In order to reduce the dimension of the drum 3 in the radial direction, the liquid chamber 15 may be arranged at a place which is not located beside the axle 19 as shown in Fig. 1, but before or behind said axle, or said liquid chamber may be divided into two parts, one before and one behind the axle 19. The chamber 15 may be also located on the side of the axis 8 which is opposite to the axle 19, in which case the chamber should be connected to the tube 23 by a channel bent in the shape of a circle having its centre located in the axis 8. If the chamber 15 should be able to be emptied completely, it is desirable to make the tube 23 also curved, since a straight tube may act as a siphon in connection with the curved nature of the equipotential surfaces in the liquid.

In many cases it is desirable that the liquid chamber 15 be capable of being completely emptied after the device has been stopped. Assuming that the rotating system without any liquid therein is substantially balanced, the advantage will then be obtained, that, even if the handwheel occupies a position which normally corresponds to a great amplitude, the amplitude will be still zero or very small when starting and will reach the value corresponding to the position of the handwheel only gradually and not before the full speed of rotation has been reached. By this arrangement disagreeable phenomena of vibration which may occur during starting various screen devices can be avoided.

Upon stopping the device the liquid chamber 15 may come to a standstill in various positions. In order to ensure emptying of said chamber in every position, narrow discharge channels may be provided in the corners 41 and 42 (Fig. 2) in which oil could be left behind. As long as the quantity of liquid which is able to flow off through such corner discharge channels per unit of time is small with regard to the quantities of liquid passing through the tubes 14 and 23, this will not affect the operation of the device. In order to accelerate flowing off, the discharge channels in the corners 41 and 42 may be carried out according to Fig. 3.

Here the channel 43 has an enlarged lower end with a threaded part 44. In the channel is provided a ball 45 which is retained in the channel 43 by a threaded plug 46 having a central bore. A spring 47 located in said bore and resting upon the narrowed outer end 48 thereof keeps the ball 45 free from the plug and also free from the mouth of the channel 43. The liquid can easily flow off along the ball 45, if the system with the liquid chamber 15 is at rest. If, however, the system is rotating, the ball 45 is pressed against the plug 46 by centrifugal force so as to practically close the opening. If the device is to be able to operate with an empty liquid chamber 15, it is important that the container 9 be sufficiently large to contain all the liquid.

Fig. 4 shows a device according to another embodiment of the invention used in a regulating device for a hammer mill. The hammer mill 50 is driven by an electric motor 51. The supply of material is effected by means of a gate or runner 52 sustained by springs 53 and put into vibration by a vibrator 54. The material comes from a storage vessel 55.

The supply of material to the hammer mill is controlled by adjusting the amplitude of the vibration of the gate 52. The vibrator 54 for the gate 52 comprises a motor fed from a network through a switch 56, a rotatable drum 57 (see Fig. 5) being mounted upon the axis of said motor. This drum 57 comprises a liquid chamber 58 which is counterbalanced in empty position by a counterweight 59. The rotatable drum 57 is surrounded by a stationary housing 60 for accumulating the liquid which is thrown out of the chamber 58 through an opening 61 in the bottom of said chamber. This liquid then flows through a pipe 62 to a reservoir 63. From said reservoir the liquid is pumped by a pump 64 driven by an electric motor which is also supplied through an electrical circuit controlled by the switch 56. The pressure pipe 65 of the pump 64 leads through an adjustable cock 66 to a ring shaped gutter 58A located within, and concentric with, the drum 57 (Fig. 5). Near the open side of the chamber 58 this gutter has an opening permitting the liquid to enter directly from said gutter into the chamber.

By means of a step-down transmission with an intermediate axis 67 (Fig. 4) the motor of the pump 64 is connected to a pin 68 moving along a circle 69, e. g. one time per second. At each revolution the pin 68 forces an arm 70 connected to the plug of the cock 66 into the position in which the cock is closed or has a small passage. Under the influence of a spring 71 the arm 70 is moved back again into a position in which the cock 66 is open. On an average the effect of this intermittent closure of the cock 66 is not great, the supply of liquid to the chamber 58 being much greater than the discharge through the opening 61. The level in the chamber 58 will, therefore, gradually rise to increase the amplitude of vibration of the gate 52. Consequently the supply to the hammer mill 50 and the current consumption of the motor 51 will also increase. In one of the current supply lines, viz. in the line 72, a coil 73 is inserted which is wound upon an iron core 74. If the current in the line 72 exceeds a certain value, the arm 70, which in its lowermost position abuts against a copper pin 74A upon the core 74, will be kept in this position in spite of the force which is exerted by the spring 71. It will be evident that, as soon as the current has exceeded this value, the level of the liquid in the chamber 58 will have to descend to decrease the amplitude of vibration of the gate 52, since liquid will continue to flow off through the opening 61, but no liquid will be supplied to said chamber. The supply of material to the hammer mill will, therefore, decrease and consequently the load of the motor 51 and the current in the line 72 will be decreased as well. Now the core 74 will be no longer able to hold the arm 70, after which the level in the chamber 58 will rise again. The load of the motor 51 will, therefore, fluctuate between narrow limits about the value at which the tractive force of the core 74 can just hold the arm 70. The load upon which the regulating device adjusts itself may be regulated at will, e. g. by adjusting the tension of the spring 71.

For the described device it is important that the pump 64 and the vibrator 54 will be simultaneously switched off by the switch 56, since the device will then always start after a short rest with an empty or nearly empty chamber 58, so that the regulation of the load of the hammer mill will be always effected safely.

Figure 6:
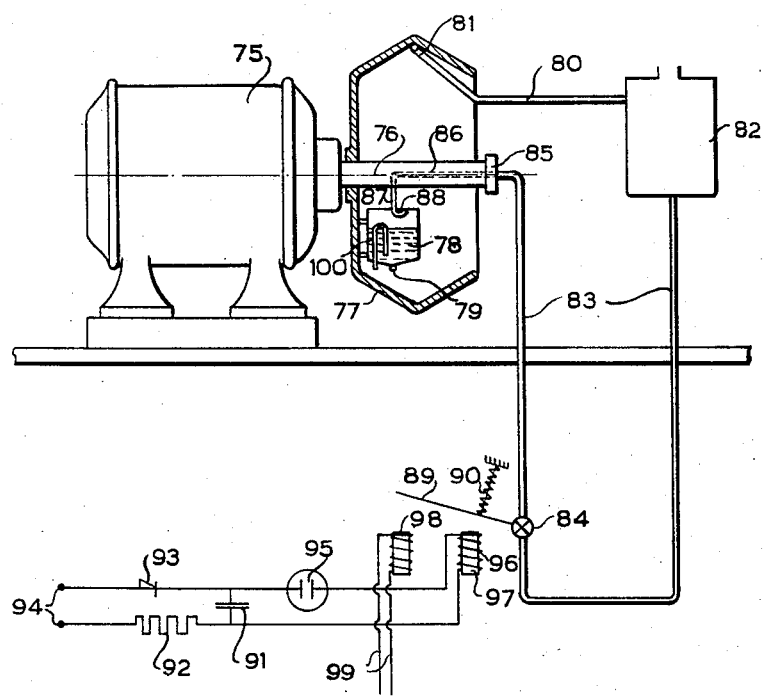
Fig. 6 is a diagrammatic view of a third embodiment.

Still another embodiment of the invention has been diagrammatically shown in Fig. 6, and is intended for use in the same manner as the device of Figs. 4 and 5. A motor 75 carries on its axis 76 a rotating drum 77. Within said rotating drum is provided a chamber 78 in which the level of the liquid determines the amplitude of the vibrations of the system. If the chamber 78 is filled with liquid, there will be always liquid leaving said chamber through an opening 79 in the bottom thereof. Said liquid will be distributed along the inner circumference of the drum. By means of a fixed tube 80 the open end 81 of which acts as a scooping member the liquid is removed from the rotating drum and forced into a container 82. From this container the liquid flows through a tube 83 provided with a cock 84 and through a liquid-tight joint 85 into the hollow portion 86 of the axis 76 from which it can escape through a radial tube 87. The tube 87 has a bent end, in order to avoid filling of the tube 87 with air at the times when the cock 84 is closed.

The liquid leaving the tube 87 enters into the chamber 78. The level in said chamber determines the amplitude of the vibrations of the supplying device of a hammer mill in the same manner as in the device according to Figs. 4 and 5.

The plug of the cock 84 carries an arm 89 adapted to swing to and fro by a predetermined angle. A spring 90 tends to keep the arm 89 in its uppermost position. A condenser 91 is charged through a resistance 92 and a rectifier 93 by the current from an alternating current supply source 94, said condenser 91 suddenly discharging itself partially at the end of a definite time, e. g. after one second, through a neon-glow lamp 95 and a coil 96 wound around an iron core 97. This causes the core 97 to become magnetic, in consequence of which the arm 89 is forced into its lowermost position. In this position the cock 84 is closed or nearly closed. Usually the arm immediately returns into its uppermost position corresponding to the open position of the cock 84 by virtue of the spring 90. Only when the force of the spring is overcome by the excitation of a second iron core 98 energized through a line 99 by a current which is dependent on the load of the hammer mill, is the arm 89 retained in its lowermost position following deenergizing of the coil 96. The regulating operation is thus the same as in the device according to Figs. 4 and 5 and needs no further explanation.

The driving force causing the liquid to circulate through the system partly occurs at the nozzle 81 and is partly due to the centrifugal action on the liquid in the tube 87. If desired, use could be made of only one of these effects. When use is made of the centrifugal action on the liquid in the tube 87, it is preferable to insert a return valve in the pipes.

In the device according to Figs. 4 and 5 there is a risk that the chamber 58 may be filled till its edge and will remain filled even after the vessel 55 is empty. When in this case the vessel 55 is suddenly filled, this may lead to a considerable overload of the hammer mill. In order to reduce this risk, in the device according to Fig. 6 a siphon tube 100 has been provided in the chamber 78, said tube completely emptying the chamber in a very short time, as soon as the level in said chamber has reached a predetermined value. The risk of overloading the hammer mill will then be incurred only during a small part of the time.

The invention may be also used advantageously in automatic weighing apparatus for pulverized or granular materials which are supplied by a vibrator to a weighing vessel. It is desirable to decrease the speed of supply when the exact quantity has been almost reached. A device in which this is attained has been diagrammatically shown in Fig. 7.

In a number of containers, of which only the containers 101 and 102 have been indicated, materials have been stored which should be mixed together in a predetermined proportion. Assuming that 50 kg. of the material in container 101 should be mixed with 40 kg. of the material in container 102 and 10 kg. of the material in a third container. This is effected by first weighing out in a mixing vessel 103 50 kg. of the material from container 101 and then supplying material from the container 102 till a total weight of 90 kg. is reached. Thereafter the supply from said container 102 is stopped and material from the third container is supplied till the total weight amounts to 100 kg.

The weight of the material in the weighing vessel 103 is indicated by a pointer 104 rotatable on an axis 104A and moving with a contact spring along contact segments 105. The pointer 104 has been shown in the starting position. The first, second, third and fourth contact segment are electrically connected in parallel to a line 106, whereas the fifth contact segment is connected to a line 106A. The three following segments are connected in parallel to a line 107 and the two segments next to said three segments are respectively connected to a line 107A and to a line 108A.

In the starting position the pointer makes contact with the first contact segment, whereby a source of current 109 produces a current flowing through the pointer 104, the line 106 and a relay coil 111, if the switch 110 is closed to start the weighing operation. The coil 111 actuates a switch 112, so that a motor 113 is connected, through a suitable electrical circuit, to an electric source 114.

Together with the axis 115 of the motor 113 rotates a liquid chamber 116 to which normally liquid is continuously supplied through a pipe 117. Normally liquid will be continuously thrown out of the chamber 116 through a narrow opening 118 provided in the bottom of said chamber. This liquid is accumulated in a drum 119 and is delivered through a pipe 120 into a reservoir 121, after which it is forced back again into the pipe 117 by a pump 122. The reservoir 121 and the pump 122 may be common to all the vibrators associated with the several containers. The resistance of the opening 118 is chosen in such a manner that under the described circumstances and when the motor 113 runs, the chamber 116 will soon be filled and will begin to flow over, even if it is initially empty. When the motor 113, which is fixed to a vibrating gate or gutter 123 beneath the container 101, is energized, a dense stream of material will flow from container 101 to the weighing vessel 103. When 40 kg. material has been delivered, the pointer 104 interrupts the current through the line 106 and further causes the current to flow through the line 106A, whereby the relay 111A is energized and the relay 111 is deenergized, so that the switch 112A is closed and the switch 112 is opened to maintain the motor 113 in its energized condition. However, a contact 124A is also closed by the relay 111A, whereby a source of current 125 is able to energize a coil 126. This coil 126 forms part of a magnetically actuated valve comprising a cylinder 127 transversely arranged in the pipe 117 and in which are movable an iron cylinder 128 and a copper cylinder 129 which are connected together. A spring 130 normally forces the cylinders 128 and 129 to the left, whereby the tube 117 affords a free passage to the liquid. If, however, the coil 126 outside the cylinder 127 is energized, this coil will draw the cylinder 128 inwards, whereby the cylinder 129 closes the passage for the liquid. The liquid flowing from the chamber 116 through the opening 118 will no longer be replaced by liquid from the pipe 117, so that the chamber is emptied in a lapse of time which may be chosen equal to the time in which about 8 or 9 kg. is supplied by the vibrated gate 123 from the container 101 to the weighing vessel. The vibrator is so constructed that with an empty chamber 116 a small eccentricity of the centre of gravity still exists. The last 1 or 2 kg. will thus be supplied to the weighing vessel very slowly. It follows that the disconnecting of the vibrator may be effected by switching off the motor and no too large quantity of material will be supplied thereafter. If desired the motor may be of a type which is rapidly braked by friction when the current is interrupted.

After having weighed out the material from the container 101, use is made of a similar device which is controlled through the lines 107 and 107A instead of through the lines 106 and 106A and which works in the same manner. Since the third quantity only amounts to 10 kg., said quantity is supplied with interrupted liquid supply to the chamber of the vibrator in question, which has been indicated by connecting a line 108A with the contact segment in question.

What I claim is:

1. A device for producing a vibrating movement of a continuously controllable amplitude, comprising a rotatable member having a chamber defined therein which is located eccentrically with respect to the axis of rotation of said rotatable member, said chamber having an outlet opening therein through which liquid supplied to said chamber can be discharged from the latter, fixed liquid collecting means operative to collect liquid discharged from said chamber as said rotatable member is rotated, means for rotating said member, means for supplying a liquid to said chamber including a fixed conduit, fixed return means operatively connected between said fixed liquid collecting means and said fixed conduit of the liquid supplying means for feeding the discharged liquid back to the liquid supplying means, and control means actuable externally of said rotatable member and independent of the rotation of the latter for continuously regulating the mass of liquid in said chamber and, hence, for continuously determining the amplitude of the vibrations produced by rotation of said member.

2. A device as in claim 1; wherein said fixed liquid collecting means operative to collect liquid discharged from the chamber includes a fixed housing circumferentially surrounding said rotatable member and spaced from the latter to define an annular space for receiving the discharged liquid.

3. A device as in claim 2; wherein said rotatable member has radial vanes extending into said annular space and rotating with said member, said housing having a tangential opening from said annular space and through which the liquid received in the latter is impelled by the pumping action of said vanes; and wherein said return means includes a reservoir receiving liquid pumped through said tangential opening and having said fixed conduit of the liquid supplying means connected thereto.

4. A device as in claim 2; wherein said control means includes a tubular control member communicating, at one end, with said outlet opening of the chamber, said tubular control member being rotatable with said rotatable member and movable relative to the latter to vary the radial distance from the axis of rotation of said rotatable member to the other end of said tubular control member, thereby to determine the quantity of liquid that may be contained in said chamber, and mechanical means for effecting movement of said tubular control member relative to said rotatable member and having actuating parts which are non-rotatable with said rotatable member and driving parts turning with said rotatable member and connected to said actuating parts to be driven by the latter.

5. A device as in claim 1; wherein said rotatable member has its center of gravity coinciding with the axis of rotation thereof when said chamber is emptied of all liquid so that the amplitudes of vibrations produced by rotation of said rotatable member can be varied between zero and a value corresponding to the condition in which said chamber is full of liquid.

6. A device as in claim 5; wherein said outlet opening is at a location in said chamber which is most remote from the axis of rotation of said rotatable member, and said fixed liquid collecting means operative to collect liquid discharged from the chamber includes a fixed housing circumferentially surrounding said rotatable member for receiving the discharged liquid and conducting means extending from the lowest point of said fixed housing for draining the received liquid from the latter; and wherein said return means includes a reservoir for the liquid receiving the latter from said conducting means and delivering the liquid to said fixed conduit of the liquid supplying means, and said control means is interposed in said fixed conduit and regulates the rate of flow of the liquid through the latter.

7. A device as in claim 6; wherein said means for supplying a liquid to the chamber further includes an annular gutter rotatable with said rotatable member and having an axial opening in at least one end, and a transfer pipe opening radially from said gutter into said chamber, said fixed conduit of the liquid supplying means extending axially into said gutter through said axial opening of the latter while permitting rotation of said gutter with said rotatable member independent of said fixed conduit so that liquid from the latter flows into said gutter and then, through said transfer pipe, into said chamber.

8. A device as in claim 1; wherein said rotatable member includes an annular outer wall and an internal structure radially inside of said outer wall and defining said chamber so that liquid discharged from the latter will be centrifugally deposited against said annular outer wall, and wherein said fixed liquid collecting means operative to collect the discharged liquid includes a fixed pipe extending generally axially into said rotatable member and having an inner end opening adjacent said annular wall in the tangential direction opposed to the direction of rotation of said rotatable member so as to be operative to scoop up liquid which is centrifugally deposited against said annular wall.

9. In combination with a device for producing a vibrating movement as in claim 1, a machine for treating a material, a motor for driving said material treating machine, a supply member for delivering the material to be treated to said machine and connected to said device for vibration by the latter so that the rate of delivery of the material to said machine is dependent upon the amplitude of the vibrations produced by said device, and means actuating said control means of the vibration producing device in response to the power consumed by said motor driving the material treating machine to provide an increase in the mass of liquid in said chamber, in the amplitude of the vibrations and, hence, in the rate of delivery of material to the machine in response to a decrease in the power consumed by said motor and, conversely, to decrease the mass of liquid in said chamber, the amplitude of the vibrations and, hence, the rate of delivery of material in response to an increase in the power consumed by said motor.

10. In combination with a device for producing vibrating movement as in claim 1, a weighing vessel, a container defining a source of a material to be weighed, material supplying means extending from said container to said weighing vessel and connected to said device for delivering material to said vessel at a rate dependent upon the amplitude of the vibrations produced by said device, and means actuating said control means of the device and responsive to the weight of material in said weighing vessel to decrease the mass of liquid in said chamber and, hence, the amplitude of the produced vibrations and the rate of delivery of said material supplying means, in response to the presence of a predetermined weight of material in said weighing vessel.

References Cited in the file of this patent

UNITED STATES PATENTS

| | | |
|---|---|---|
| 2,033,747 | Walker | Mar. 10, 1936 |
| 2,246,497 | Beck | June 24, 1941 |
| 2,634,617 | Dryg | Apr. 14, 1953 |
| 2,636,719 | O'Connor | Apr. 28, 1953 |
| 2,722,840 | Kececioglu | Nov. 8, 1955 |